(12) United States Patent
Lee et al.

(10) Patent No.: US 12,080,848 B2
(45) Date of Patent: Sep. 3, 2024

(54) ELECTROLYTE MEMBRANE FOR ALL-SOLID-STATE BATTERIES, AND METHOD FOR MANUFACTURING SAME

(71) Applicant: LG CHEM, LTD., Seoul (KR)

(72) Inventors: Jung-Pil Lee, Daejeon (KR); Eun-Bee Kim, Daejeon (KR); Ji-Hoon Ryu, Daejeon (KR); Suk-Woo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 771 days.

(21) Appl. No.: 17/267,583

(22) PCT Filed: Mar. 18, 2020

(86) PCT No.: PCT/KR2020/003719
§ 371 (c)(1),
(2) Date: Feb. 10, 2021

(87) PCT Pub. No.: WO2020/190029
PCT Pub. Date: Sep. 24, 2020

(65) Prior Publication Data
US 2021/0320332 A1  Oct. 14, 2021

(30) Foreign Application Priority Data
Mar. 19, 2019 (KR) .......... 10-2019-0031408

(51) Int. Cl.
*H01M 10/0565* (2010.01)
*H01M 10/0525* (2010.01)

(52) U.S. Cl.
CPC ... *H01M 10/0565* (2013.01); *H01M 10/0525* (2013.01); *H01M 2300/0082* (2013.01); *H01M 2300/0094* (2013.01)

(58) Field of Classification Search
CPC ..... H01M 10/0565; H01M 2300/0008; H01M 2300/0082
See application file for complete search history.

(56) References Cited

U.S. PATENT DOCUMENTS

2009/0039540 A1\* 2/2009 Nouji ............... H01M 8/1023
264/105
2013/0026409 A1 1/2013 Baker et al.
(Continued)

FOREIGN PATENT DOCUMENTS

CN 105811002 A 7/2016
EP 3 809 510 A1 4/2021
(Continued)

OTHER PUBLICATIONS

European Search Report for Appl. No. 20774162.0 dated Oct. 5, 2021.
(Continued)

*Primary Examiner* — Aiqun Li
(74) *Attorney, Agent, or Firm* — Birch, Stewart, Kolasch & Birch, LLP

(57) ABSTRACT

Provided is a solid electrolyte membrane including a support member, such as a porous sheet, embedded in an electrolyte membrane, wherein the support member is coated with an inhibiting material for inhibiting growth of lithium dendrite. Thus, the solid electrolyte membrane has excellent physical strength, such as puncture strength, and improved durability. In addition, the solid electrolyte membrane has an effect of inhibiting lithium dendrite growth. Thus, when the solid electrolyte membrane is applied to a lithium metal battery including lithium metal as a negative electrode material, there is provided an effect of improving the life characteristics of the battery.

11 Claims, 3 Drawing Sheets

(56) References Cited

U.S. PATENT DOCUMENTS

| | | | |
|---|---|---|---|
| 2014/0178770 A1 | 6/2014 | Xu et al. | |
| 2016/0301078 A1 | 10/2016 | Zhamu et al. | |
| 2017/0093001 A1 | 3/2017 | Kim et al. | |
| 2017/0214051 A1 | 7/2017 | Yoon et al. | |
| 2017/0263977 A1 | 9/2017 | Jeon et al. | |
| 2017/0294678 A1 | 10/2017 | Lee et al. | |
| 2017/0324097 A1 | 11/2017 | Lee et al. | |
| 2018/0123181 A1 | 5/2018 | Son et al. | |
| 2018/0166743 A1 | 6/2018 | Lee et al. | |
| 2018/0166759 A1* | 6/2018 | Zhamu | H01M 10/056 |
| 2018/0183084 A1 | 6/2018 | Min et al. | |
| 2018/0351190 A1 | 12/2018 | Lee et al. | |
| 2019/0051925 A1 | 2/2019 | Li et al. | |
| 2020/0127293 A1 | 4/2020 | Son et al. | |

FOREIGN PATENT DOCUMENTS

| | | |
|---|---|---|
| JP | 2012-248384 A | 12/2012 |
| JP | 2017-538266 A | 12/2017 |
| KR | 2009-218005 A | 9/2009 |
| KR | 10-2017-0015149 A | 2/2017 |
| KR | 10-2017-0037533 A | 4/2017 |
| KR | 10-2017-0024662 A | 8/2017 |
| KR | 10-2017-0089333 A | 8/2017 |
| KR | 10-2017-0113431 A | 10/2017 |
| KR | 10-2017-0118484 A | 10/2017 |
| KR | 10-2017-0128404 A | 11/2017 |
| KR | 10-2018-0032168 A | 3/2018 |
| KR | 10-2018-0046693 A | 5/2018 |
| KR | 10-2018-0068115 A | 6/2018 |
| KR | 10-2018-0076954 A | 7/2018 |
| KR | 10-2019-0017849 A | 2/2019 |
| KR | 10-2019-0142119 A | 12/2019 |
| WO | WO 2018/089899 A1 | 6/2016 |
| WO | WO 2018/217274 A1 | 11/2018 |

OTHER PUBLICATIONS

International Search Report (PCT/ISA/210) issued in PCT/KR2020/003719, dated Jun. 16, 2020.

* cited by examiner

FIG. 1 - CONVENTIONAL ART
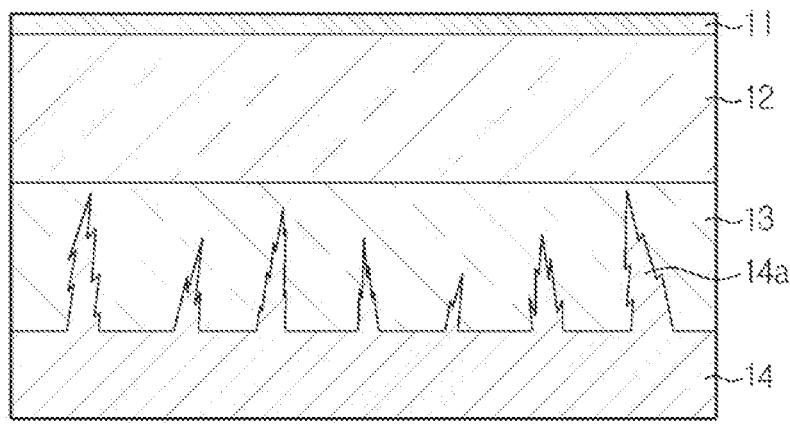
FIG. 2
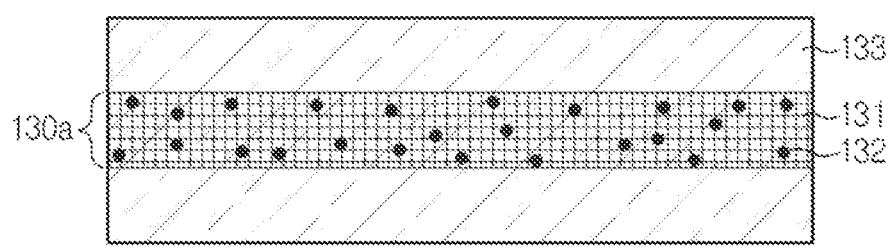

ELECTROLYTE MEMBRANE FOR ALL-SOLID-STATE BATTERIES, AND METHOD FOR MANUFACTURING SAME

TECHNICAL FIELD

The present application claims priority to Korean Patent Application No. 10-2019-0031408 filed on Mar. 19, 2019 in the Republic of Korea. The present disclosure relates to a sold electrolyte membrane for an all-solid-state battery which can inhibit growth of lithium dendrite and a method for manufacturing the solid electrolyte membrane. The present disclosure also relates to an all-solid-state battery including the solid electrolyte membrane.

BACKGROUND ART

A lithium ion battery using a liquid electrolyte has a structure in which a negative electrode and positive electrode are defined by a separator, and thus may cause a short-circuit when the separator is damaged by deformation or external impact, resulting in a risk, such as overheating or explosion. Therefore, it can be said that development of a solid electrolyte capable of ensuring safety is a very important problem in the field of lithium ion secondary batteries.

A lithium secondary battery using a solid electrolyte is advantageous in that it has enhanced safety, prevents leakage of an electrolyte to improve the reliability of a battery, and facilitates manufacture of a thin battery. In addition, lithium metal may be used as a negative electrode to improve energy density. Thus, such a lithium secondary battery using a solid electrolyte has been expected to be applied to a high-capacity secondary battery for electric vehicles in addition to a compact secondary battery, and has been spotlighted as a next-generation battery.

In general, polymeric solid electrolyte, oxide-based solid electrolyte and sulfide-based solid electrolyte materials are used as solid electrolyte materials. When free-standing type electrolyte membranes are manufactured by using such solid electrolyte materials alone, defects, such as tearing or cracking, or separation of the electrolyte materials may occur during the manufacture or use of batteries. Particularly, when lithium metal is used as a negative electrode active material, there is a problem in that lithium dendrite is grown from the negative electrode surface and the grown lithium dendrite causes a short-circuit in a battery when it is in contact with a positive electrode. FIG. 1 is a schematic view illustrating an all-solid-state battery (10) obtained by interposing such a solid electrolyte membrane between a positive electrode and a negative electrode. In an all-solid-state battery, a solid electrolyte membrane functions as an electrical insulator between a positive electrode and a negative electrode, instead of a separator. Particularly, when a polymeric material is used as a solid electrolyte, the solid electrolyte membrane may be damaged due to the growth of lithium dendrite. Referring to FIG. 1, the solid electrolyte membrane is damaged by lithium dendrite grown at the negative electrode, and thus a short-circuit may occur between the positive electrode and the negative electrode. In addition, an inorganic solid electrolyte is generally formed by integrating particle-type ion conductive inorganic materials into a layered structure, and thus includes a plurality of pores due to the interstitial volumes among the particles. Therefore, lithium dendrite may be grown in the spaces provided by the pores and lithium dendrite grown through the pores may be in contact with the positive electrode, resulting in a short-circuit. Under these circumstances, there is a need for developing an electrolyte membrane for an all-solid-state battery which can inhibit growth of lithium dendrite.

DISCLOSURE

Technical Problem

The present disclosure is designed to solve the problems of the related art, and therefore the present disclosure is directed to providing a solid electrolyte membrane which has improved durability and safety. The present disclosure is also directed to providing a method for manufacturing the solid electrolyte membrane and an all-solid-state battery including the electrolyte membrane. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

The present disclosure is designed to solve the problems of the related art and relates to a solid electrolyte membrane, a method for manufacturing the solid electrolyte membrane and a secondary battery including the solid electrolyte membrane.

According to the first embodiment of the present disclosure, there is provided a solid electrolyte membrane which includes a support member, a dendrite growth-inhibiting material and a first solid electrolyte material, wherein the support member has a porous sheet-like shape including a plurality of pores, is embedded in the solid electrolyte membrane, and is at least partially surface-coated with the lithium dendrite growth-inhibiting material; the lithium dendrite growth-inhibiting material (a) is provided in the form of (a1) a metal salt derived from a metal having lower ionization tendency as compared to lithium, (a2) a metal ion thereof, or both; the porous sheet is a porous material including a plurality of pores, and the pores may be penetrated through by flowable materials; and the solid electrolyte membrane has an ion conductivity of $1.0 \times 10^{-7}$ S/cm or more.

According to the second embodiment of the present disclosure, there is provided the solid electrolyte membrane as defined in the first embodiment, wherein the metal is K, Sr, Ca, Na, Mg, Be, Al, Mn, Zn, Cr(+3), Fe, Cd, Co, Ni, Sn, Pb, Cu, Hg, Ag, Pd, Ir, Pt(+2), Au, Pt(+4), or two or more of them.

According to the third embodiment of the present disclosure, there is provided the solid electrolyte membrane as defined in the second embodiment, wherein the metal is Au, Pt, or two or more of them.

According to the fourth embodiment of the present disclosure, there is provided the solid electrolyte membrane as defined in any one of the first to the third embodiments, wherein the metal salt is chloride, iodide, cyanide, bromide, sulfide, hydroxide, phosphite, chloride hydrate, or two or more of them.

According to the fifth embodiment of the present disclosure, there is provided the solid electrolyte membrane as defined in any one of the first to the fourth embodiments, wherein the solid electrolyte material includes an ion conductive polymeric solid electrolyte material.

According to the sixth embodiment of the present disclosure, there is provided the solid electrolyte membrane as defined in the fifth embodiment, wherein the polymeric solid electrolyte material is prepared by adding a polymer resin to a solvated lithium salt, and shows an ion conductivity.

According to the seventh embodiment of the present disclosure, there is provided the solid electrolyte membrane as defined in any one of the first to the sixth embodiments, wherein the porous sheet is at least one of a polymer film including a plurality of pores, a woven web including a polymeric material, and a non-woven web including a polymeric material.

According to the eighth embodiment of the present disclosure, there is provided the solid electrolyte membrane as defined in any one of the first to the seventh embodiments, wherein the support member is embedded in the solid electrolyte membrane, and is disposed in such a manner that the support member may not be exposed to the top surface, bottom surface or both surfaces of the solid electrolyte membrane.

According to the ninth embodiment of the present disclosure, there is provided the solid electrolyte membrane as defined in any one of the first to the eighth embodiments, which further includes an oxide-based solid electrolyte material, a sulfide-based solid electrolyte material, or two or more solid electrolyte materials of them.

According to the tenth embodiment of the present disclosure, there is provided a method for manufacturing the solid electrolyte membrane as defined in any one of the first to the ninth embodiments, including the steps of: (S1) preparing at least one solid electrolyte film and at least one support member coated with an inhibiting material; (S2) stacking the supporting member with the solid electrolyte film to prepare a laminate structure; and (S3) pressing the laminate structure so that the support member may be embedded in the solid electrolyte film.

According to the eleventh embodiment of the present disclosure, there is provided the method as defined in the tenth embodiment, wherein the laminate structure in step (S2) includes the support member interposed between two sheets of solid electrolyte films.

According to the twelfth embodiment of the present disclosure, there is provided a method for manufacturing the solid electrolyte membrane as defined in any one of the first to the ninth embodiments, which includes impregnating a support member coated with an inhibiting material with an impregnating composition containing a solid electrolyte material so that the pores of the support member may be filled with the impregnating composition.

According to the thirteenth embodiment of the present disclosure, there is provided an all-solid-state battery including a negative electrode, a positive electrode and a solid electrolyte membrane interposed between the negative electrode and the positive electrode, wherein the negative electrode includes lithium metal as an electrode active material and the solid electrolyte membrane is the same as defined in any one of the first to the ninth embodiments.

Advantageous Effects

The solid electrolyte membrane according to the present disclosure includes a support member, such as a porous sheet, embedded in an electrolyte membrane, wherein the support member is characterized in that it is coated with a lithium dendrite growth-inhibiting material. As a result, the solid electrolyte membrane according to the present disclosure has excellent physical strength, such as puncture strength, and improved durability. In addition, the solid electrolyte membrane according to the present disclosure has an effect of inhibiting lithium dendrite growth. Thus, when the solid electrolyte membrane is applied to a lithium metal battery including lithium metal as a negative electrode active material, there is provided an effect of improving the life characteristics of the battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

FIG. 1 is a schematic view illustrating the sectional structure of the conventional solid electrolyte battery.

FIG. 2 is a schematic view illustrating the sectional structure of the solid electrolyte membrane according to an embodiment of the present disclosure.

BEST MODE

Figure 3:
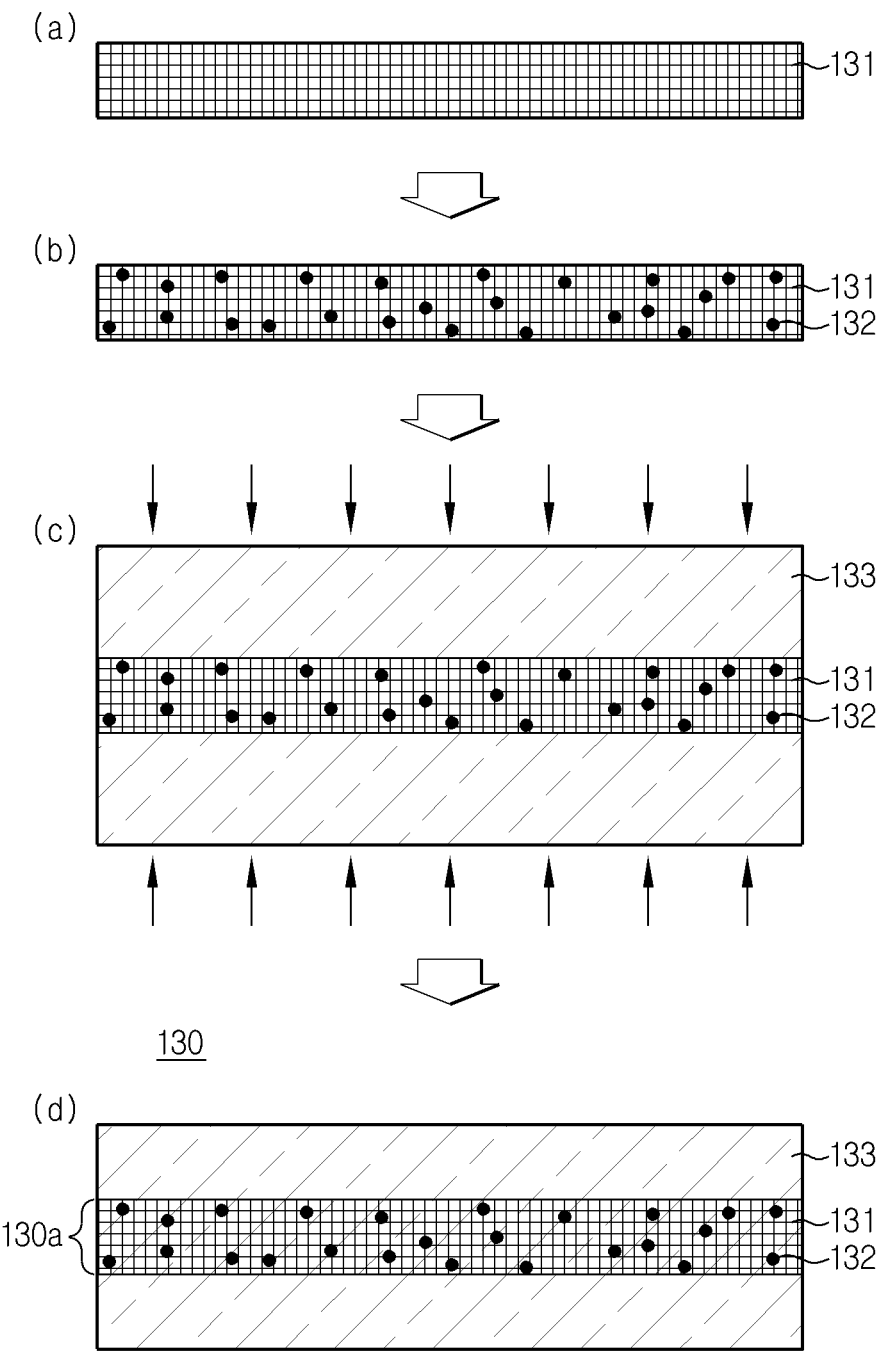
FIG. 3 is a schematic view illustrating the flow chart of the method for manufacturing a solid electrolyte membrane according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part ⌈includes⌋ an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to an electrolyte membrane for an all-solid-state battery and an all-solid-state battery including the same. The present disclosure also relates to a method for manufacturing the electrolyte membrane. The solid electrolyte membrane according to the present disclosure has high physical strength to provide an effect of improving durability. When the solid electrolyte membrane is applied to a battery, lithium dendrite growth is inhibited to provide an effect of significantly improving the life characteristics of the battery.

FIG. 2 is a schematic view illustrating the solid electrolyte membrane according to an embodiment of the present disclosure. In addition, FIG. 3 is a schematic view illustrating the flow chart of the method for manufacturing a solid electrolyte membrane according to an embodiment of the present disclosure. Hereinafter, the present disclosure will be explained in more detail with reference to the accompanying drawings.

The solid electrolyte membrane according to the present disclosure is interposed between the positive electrode and the negative electrode of an all-solid-state battery and functions as an insulating and ion conductive channel. Preferably, the solid electrolyte membrane has an ion conductivity of $1.0 \times 10^{-7}$ S/cm or more. The solid electrolyte membrane includes a solid electrolyte material, a lithium dendrite growth-inhibiting material and a support member, wherein the support member is embedded in the solid electrolyte membrane. In addition, the inhibiting material is incorporated to the solid electrolyte membrane by being coated on the support member or mixed with the solid electrolyte material.

Meanwhile, hereinafter, the portion where the support member is embedded in the solid electrolyte membrane will be referred to as a support layer, and the portions of the solid electrolyte membrane having no support member above and below the support layer will be referred to as solid electrolyte layers. Referring to FIG. 2, the portion above the support layer will be referred to as an upper solid electrolyte layer and the portion below the support layer will be referred to as a lower solid electrolyte layer.

When the inhibiting material is incorporated to the solid electrolyte membrane by being mixed with the solid electrolyte material, the solid electrolyte membrane may be prepared in such a manner that the whole of the inhibiting material, or at least 80 wt % or at least 90 wt % of the inhibiting material contained in the solid electrolyte membrane may be distributed in the support layer portion.

When the inhibiting material is incorporated to the solid electrolyte membrane by being mixed with the solid electrolyte material, the solid electrolyte membrane may be prepared in such a manner that the whole of the inhibiting material, or at least 80 wt % or at least 90 wt % of the inhibiting material contained in the solid electrolyte material may be distributed in the support layer portion.

FIG. 2 illustrates the sectional structure of the solid electrolyte membrane according to an embodiment of the present disclosure, wherein the solid electrolyte membrane has a structure including a lower solid electrolyte layer, a support layer and an upper solid electrolyte layer, stacked successively. Herein, the support layer includes a mixture containing a solid electrolyte material and a lithium dendrite growth-inhibiting material, and a support member having a plurality of pores. The support layer is provided in the form of a composite of the mixture with the support member, wherein the support member is impregnated with the mixture and the pores of the support member are totally or partially filled with the mixture.

According to the present disclosure, the support layer includes a lithium dendrite growth-inhibiting material. According to an embodiment of the present disclosure, the inhibiting material may be incorporated by being coated on the support member of the support layer, being dispersed in the solid electrolyte material contained in the support layer, or both. As used herein, 'dendrite growth-inhibiting material' may be referred to as 'inhibiting material' in brief.

According to the present disclosure, the inhibiting material is a metal salt or metal ion of a metal having lower ionization tendency s compared to lithium, or both. Since the inhibiting material has lower reactivity as compared to lithium, i.e. it has lower ionization tendency, lithium ions are reduced by the inhibiting material to prevent deposition of lithium metal. In addition, deposited lithium is oxidized back to lithium ions to provide an effect of reducing dendrite.

According to the present disclosure, the inhibiting material (a) is derived from at least one of (a1) metal(s) having lower ionization tendency as compared to lithium, and (a2) alloy(s) of two or more of metal(s) having lower ionization tendency as compared to lithium, includes a salt thereof (metal, alloy or both), ion thereof, or both, and is distributed in the support layer. In other words, the support layer includes at least one of salts of the metals, salts of the alloys, ions of the metals and ions of the alloys.

According to an embodiment of the present disclosure, the metal (a1) may be at least one selected from the group consisting of K, Sr, Ca, Na, Mg, Be, Al, Mn, Zn, Cr(+3), Fe, Cd, Co, Ni, Sn, Pb, Cu, Hg, Ag, Pd, Ir, Pt(+2), Au and Pt(+4). In addition, the alloy (a2) is formed by alloying of two or more metals selected from the metal ingredients. According to an embodiment of the present disclosure, the metal salt may be at least one of chloride, iodide, cyanide, bromide, sulfide, hydroxide, phosphite and chloride hydrate. However, the scope of the present disclosure is not limited thereto, as long as the metal or alloy can react with lithium metal to oxidize lithium metal into ionic forms. Meanwhile, according to an embodiment of the present disclosure, an inhibiting material having lower ionization tendency provides a higher effect of inhibiting growth of lithium dendrite.

Thus, the inhibiting material may include at least one of Au and Pt. According to an embodiment of the present disclosure, when Au is used as an inhibiting material, a salt thereof, $HAuCl_4 \cdot 3H_2O$, may be introduced, when forming the support layer. In addition, when Pt is used as an inhibiting material, a salt thereof, $H_2PtCl_6 \cdot H_2O$, may be introduced, when forming the support layer.

Figure 5:
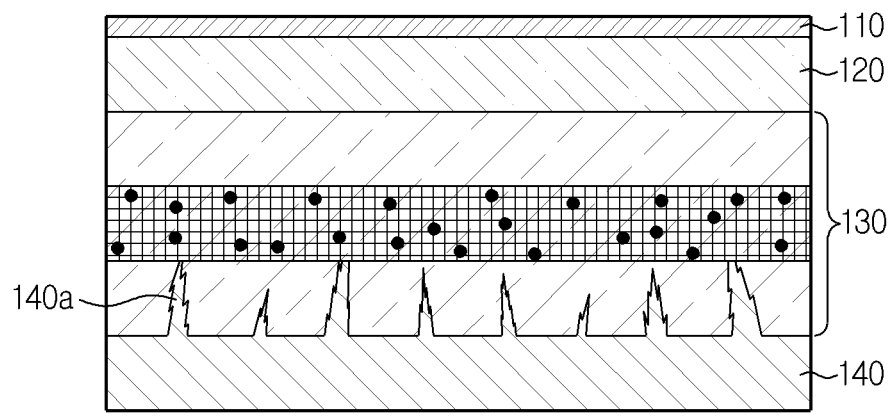

Thus, the electrolyte membrane according to the present disclosure includes a lithium dendrite growth-inhibiting material. As a result, when the electrolyte membrane is applied to an all-solid-state battery including lithium metal as the negative electrode active material, it is possible to effectively inhibit a short-circuit caused by lithium dendrite growth. FIG. 5 is a schematic view illustrating the all-solid-state battery according to an embodiment of the present disclosure, wherein growth of lithium dendrite at the negative electrode is inhibited by the solid electrolyte membrane according to the present disclosure.

The solid electrolyte material may include an ion conductive polymeric solid electrolyte material. The polymeric solid electrolyte is a composite of lithium salt with polymer resin, i.e. a polymeric electrolyte material formed by adding a polymer resin to a solvated lithium salt, and preferably shows an ion conductivity of about $1\times10^{-7}$ S/cm or more, more preferably about $1\times10^{-5}$ S/cm or more.

Non-limiting examples of the polymer resin may include at least one selected from a polyether polymer, polycarbonate polymer, acrylate polymer, polysiloxane polymer, phosphazene polymer, polyethylene derivatives, alkylene oxide derivatives, such as polyethylene oxide, phosphate polymer, polyalginate lysine, polyester sulfide, polyvinyl alcohol, polyvinylidene fluoride and a polymer containing an ionically dissociable group. In addition, the polymeric electrolyte may include at least one selected from a branched copolymer including polyethylene oxide (PEO) backbone copolymerized with a comonomer including an amorphous polymer, such as PMMA, polycarbonate, polydiloxane (pdms) and/or phosphazene, comb-like polymer and a cross-linked polymer resin, as the polymer resin.

In the electrolyte according to the present disclosure, the lithium salt is an ionizable lithium salt and may be represented by $Li^+X^-$. The anion (X) of lithium salt is not particularly limited and particular examples thereof include $F^+$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SFS)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or the like.

In addition to the above, the solid electrolyte material may further include at least one selected from a sulfide-based solid electrolyte material and an oxide-based solid electrolyte material, if necessary.

The support member has a shape of porous sheet having a plurality of pores, and the porous sheet may include a polymer material. According to an embodiment of the present disclosure, the polymer sheet may include a polymer film formed by melting, extruding and orienting a polymer material through a dry process, a polymer film obtained by extracting a plasticizer through a wet process to form pores, a nonwoven web obtained by melting, spinning and compressing a polymer material, a laminate sheet including two or more layers of them, or the like. For example, the polymer sheet may be a nonwoven web. In the porous polymer sheet, a plurality of pores is formed, wherein the pores are interconnected with one another and penetrate through the substrate from one surface to the other surface so that flowable materials may pass through the pores. Any organic material or inorganic material having electrical insulation property may be used as a material for forming the porous polymer sheet. According to an embodiment of the present disclosure, the polymer sheet may include at least one of polymer resin, such as polyolefin, polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene.

According to an embodiment of the present disclosure, the porous sheet may have a thickness of about 5-90 µm. The thickness may be selected suitably within the above-defined range, considering the thickness and strength of the finished electrolyte membrane. If the thickness of the porous sheet is less than the above-defined range, it is difficult to obtain a desired level of strength of the solid electrolyte membrane. If the sheet has an excessively large thickness, it is difficult to control the thickness to a desired level, even when applying a pressurization process.

Figure 4:
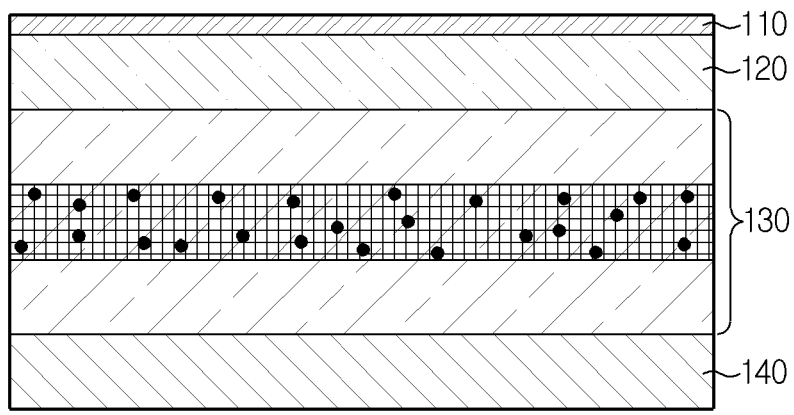
FIG. 4 and FIG. 5 are schematic views illustrating the solid electrolyte membrane according to an embodiment of the present disclosure and the all-solid-state battery including the same.

In addition, according to an embodiment of the present disclosure, the porous polymer sheet may have a porosity of about 10-90% and the pore size may be controlled suitably within a range of 50 nm to 100 µm. The porosity range and pore size range may be selected suitably within the above-defined ranges in such a manner that the porous polymer sheet may retain the electrolyte material in an amount sufficient to ensure a desired degree of ion conductivity in the porous sheet, while maintaining adequate mechanical strength. In other words, as porosity is increased, ion conductivity may be improved but mechanical strength may be degraded. In addition, as pore size is increased, durability or an effect of inhibiting lithium dendrite growth may be degraded. According to an embodiment of the present disclosure, the position where the support member is embedded in the solid electrolyte membrane may be varied depending on the structure of the finished battery to which the solid electrolyte membrane is applied. FIG. 4 illustrates the solid electrolyte membrane according to an embodiment of the present disclosure and all-solid-state battery including the same. For example, the support member may be embedded in such a manner that it may be closer to one side of the surface portion of the solid electrolyte membrane. When the support member is embedded in such a manner that it may be closer to any one side of the surface of the solid electrolyte membrane, it is preferred to dispose the support member at a position closer to the negative electrode as compared to the positive electrode in manufacturing an all-solid-state battery by stacking the positive electrode with the negative electrode.

According to an embodiment of the present disclosure, the solid electrolyte membrane may further include an oxide-based solid electrolyte material, a sulfide-based solid electrolyte material, or both. The oxide-based solid electrolyte contains oxygen (O), has ion conductivity of metals that belong to Group 1 or Group 2 in the Periodic Table. Non-limiting examples of the oxide-based solid electrolyte include at least one of LLTO compounds, $Li_6La_2CaTa_2O_{12}$, $Li_6La_2ANb_2O_{12}$ (wherein A is Ca or Sr), $Li_2Nd_3TeSbO_{12}$, $Li_3BO_{2.5}N_{0.5}$, $Li_9SiAlO_8$, LAGP compounds, LATP compounds, $Li_{1+x}Ti_{2-x}Al_xSi_y(PO_4)_{3-y}$ (wherein 0≤x≤1, 0≤y≤1), $LiAl_xZr_{2-x}(PO_4)_3$ (wherein 0≤x≤1, 0≤y≤1), $LiTi_xZr_{2-x}(PO_4)_3$ (wherein 0≤x≤1, 0≤y≤1), LISICON compounds, LIPON compounds, perovskite compounds, NASICON compounds and LLZO compounds. However, the scope of the present disclosure is not limited thereto.

The sulfide-based solid electrolyte contains sulfur (S), has ion conductivity of metals that belong to Group 1 or Group 2 in the Periodic Table, and may include Li—P—S glass or Li—P—S glass ceramic. Non-limiting examples of the sulfide-based solid electrolyte include at least one of $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$ and $Li_2S$—$GeS_2$—ZnS. However, the scope of the present disclosure is not limited thereto.

According to an embodiment of the present disclosure, the solid electrolyte membrane may further include a binder resin, if necessary. The binder resin may be introduced for the purpose of binding of solid electrolyte materials and binding of a solid electrolyte layer with battery elements (such as a support layer and/or electrodes) stacked on both surfaces thereof. There is no particular limitation in materials of the binder resin, and any material may be selected suitably within a category of ingredients used as a binding agent for electrochemical devices.

According to the present disclosure, the solid electrolyte membrane has a thickness of about 100 μm or less, preferably about 15-90 μm. Within the above-defined range, the solid electrolyte membrane may have a suitable thickness, considering ion conductivity, physical strength, energy density applied to a battery, or the like. For example, in terms of ion conductivity or energy density, the thickness may be 80 μm or less, 70 μm or less, 60 μm or less, or 50 μm or less. Meanwhile, in terms of physical strength, the thickness may be 20 μm or more, 30 μm or more, or 40 μm or more. In addition, the solid electrolyte membrane may have a tensile strength of about 500-2,000 kgf/cm$^2$, while it has the above-defined range of thickness. Further, the solid electrolyte membrane may have a porosity of 15 vol % or less, or about 10 vol % or less.

Hereinafter, the method for manufacturing a solid electrolyte membrane according to an embodiment of the present disclosure will be explained in detail.

According to an embodiment of the present disclosure, the solid electrolyte membrane may be obtained by impregnating a porous sheet with a mixture containing a polymeric solid electrolyte material and an inhibiting material to form a support layer, and stacking the support layer with at least one solid electrolyte layer.

According to an embodiment of the present disclosure, the support layer may be obtained by a dispersion impregnation method or film press-fitting method.

(1) Dispersion Impregnation Method

According to an embodiment of the present disclosure, the solid electrolyte membrane may be obtained by the following method.

First, an inhibiting material solution containing an inhibiting material is prepared and a support member is coated therewith. For example, the inhibiting material solution may be obtained by preparing a solvent, such as toluene or heptane, and introducing an inhibiting material thereto.

The coating may be carried out by any method selected from the methods used conventionally for solution coating with no particular limitation. For example, dip coating, spin coating, gravure coating, bar coating, ink jet printing, spray coating, etc. may be used, but the scope of the present disclosure is not limited thereto. When coating the support member by the solution coating method, the inhibiting material may be coated totally or partially on the outer surfaces, including the top surface and the bottom surface, of the support member. In addition, when the inhibiting material solution is introduced not only to the outer surfaces but also into the pores of the support member, the inhibiting material may be coated totally or partially on the surfaces of the pores of the support member.

According to an embodiment of the present disclosure, the coating amount or area of the inhibiting material on the support member may be controlled by the coating process or thickness and area of the support member, coating time, concentration or viscosity of the inhibiting material solution, or the like. When the amount of the inhibiting material is excessively large, it is difficult to transport ions through the electrolyte membrane. Thus, it is preferred to control the coating amount of the inhibiting material suitably.

Meanwhile, the inhibiting material solution has a significantly low concentration (e.g. 10 wt % or less). Thus, even after coating the support member with the inhibiting material, most of the pores of the support member are maintained in the same state before coating, and there is little effect upon the porosity or air permeability.

Next, a dispersion containing a solid electrolyte material is prepared and the support member coated with the inhibiting material in the preceding step is impregnated with the dispersion. The dispersion may be prepared by introducing a solid electrolyte material to a suitable solvent. Then, a porous sheet as a support member may be dipped in the dispersion or the dispersion is applied to the porous sheet so that the dispersion may be introduced to the pores of the porous sheet. To accelerate introduction of the dispersion into the pores of the porous sheet, a supplement step of pressurizing the sheet may be further carried out after the impregnation or application. The application method is not particularly limited, and particular examples thereof include known methods, such as coating using a doctor blade, bar coater or applicator, spray coating, electrostatic painting, brush coating, electrostatic printing or electrospray deposition, aerodeposition coating, or the like. After that, the porous sheet impregnated with the dispersion may be dried to obtain a support layer. According to the present disclosure, the solvent used for preparing the dispersion may include toluene, heptane, or the like. The method for preparing the dispersion or carrying out drying is not particularly limited, and any known method may be used.

Meanwhile, according to another embodiment of the present disclosure, the dispersion may further include an inhibiting material so that a dispersion containing an inhibiting material may be prepared. Then, a support member not coated with an inhibiting material may be impregnated with the dispersion to obtain a solid electrolyte membrane. Herein, reference will be made to the above description about the impregnation method.

(2) Film Press-Fitting Method

According to still another embodiment of the present disclosure, a solid electrolyte membrane may be obtained by manufacturing an electrolyte film, and then press-fitting and embedding a support member into the solid electrolyte film. FIG. 3 is a schematic view illustrating a method for manufacturing a solid electrolyte membrane through a film press-fitting process. FIG. 3 illustrates a method which includes preparing a support member (step a), coating the support member with an inhibiting material (step b), and interposing the coated support member between electrolyte films (step c), and carrying out pressurization so that the support member may be embedded in the electrolyte films. Hereinafter, the method will be explained in detail with reference to FIG. 3.

First, an electrolyte film and a support member coated with an inhibiting material are prepared. Reference will be made to the above description in the part of dispersion impregnation method about the preparation of the support member coated with an inhibiting material.

The electrolyte film may be prepared as follows. First, a solid electrolyte material is introduced to a suitable solvent to prepare slurry for forming an electrolyte film. According to an embodiment of the present disclosure, the solid electrolyte material used for the film press-fitting process preferably includes a polymeric solid electrolyte material. The solvent may be selected suitably depending on the solid electrolyte material to be used. For example, when an alkylene oxide-based electrolyte, such as polyethylene oxide (PEO), is used as a polymer resin, acetonitrile may be used as a solvent. Next, the slurry is applied to a release sheet, such as a terephthalate film, and molded into the shape of a film having a desired thickness. The application and molding may be carried out by using a known coating process, such as doctor blade coating. Then, the molded film is dried to remove the solvent and to obtain an electrolyte film.

The obtained electrolyte film is stacked with a porous sheet, such as a nonwoven web, to prepare a laminate structure and pressurization is carried out to press the electrolyte film into the sheet so that the porous sheet may be embedded in the electrolyte membrane. The pressurization may be carried out by using at least one device, such as a roll press, uniaxial press or a jig. Herein, it is possible to provide the electrolyte membrane with a suitable thickness and/or porosity by controlling the processing conditions, such as a press, roller, jig interval, applied pressure and temperature.

According to an embodiment of the present disclosure, a sold electrolyte membrane having a structure including a support member embedded therein may be obtained by preparing two or more sheets of electrolyte films, interposing the support member coated with the inhibiting material between two electrolyte films to prepare a laminate structure, and pressurizing the laminate structure. For example, a solid electrolyte membrane may be obtained by preparing two sheets of electrolyte films in the above-described manner, stacking a porous sheet with the electrolyte films in such a manner that a support member, such as a porous sheet, may be interposed between two sheets of electrolyte films, thereby providing a laminate structure, and then pressurizing at least one surface of the laminate structure so that the porous sheet may be embedded therein. In this case, since the solid electrolyte material may be press-fitted on both surfaces of the porous sheet, the solid electrolyte material may be packed even into the central portion of the sheet based on the thickness direction of the sheet with higher density, as compared to the embodiment in which the solid electrolyte material is press-fitted on one surface of the porous sheet. The pressurization may be carried out by using a suitably selected known pressurization member and pressurization method, such as roll press, flat press, or pressurization jig, and is not limited to any particular method.

According to an embodiment of the present disclosure, the thickness of the electrolyte film disposed on the upper part of the support member and that of the electrolyte film disposed on the lower part of the support member may be the same or different to control the depth to which the support member is embedded in the solid electrolyte membrane.

According to an embodiment of the present disclosure, the total thickness of the electrolyte films disposed on the upper part and lower part of the support member may be larger than the thickness of the support member. When press-fitting is carried out by controlling the thickness of the electrolyte films as mentioned above, electrolyte film portions remain while not being press-fitted into both surfaces of the support member. Therefore, it is possible to realize a solid electrolyte membrane structure including a support member embedded in a solid electrolyte membrane with ease.

Meanwhile, according to an embodiment of the present disclosure, a solid electrolyte membrane may be obtained by further introducing an inhibiting material to the slurry to prepare slurry containing an inhibiting material, and pressurizing a support member not coated with an inhibiting material against the slurry to carry out embedding. Herein, reference will be made to the above description about the pressurization method.

In addition to the above methods, a support layer may be obtained by applying a mixture containing powder of a solid electrolyte material and an inhibiting material to the surface of a porous sheet, and carrying out pressurization so that the mixture may be press-fitted into the pores of the porous sheet. When the mixture is press-fitted in a powder state, it is preferred to use an oxide-based solid electrolyte or sulfide-based solid electrolyte as a solid electrolyte material.

In another aspect of the present disclosure, there is provided an all-solid-state battery including the above-described solid electrolyte membrane. The all-solid-state battery includes a positive electrode, a negative electrode and a solid electrolyte membrane. According to an embodiment of the present disclosure, the negative electrode may include lithium metal as a negative electrode active material.

According to the present disclosure, each of the positive electrode and the negative electrode may include a current collector and an electrode active material layer formed on at least one surface of the current collector, wherein the electrode active material layer may include a plurality of electrode active material particles and a solid electrolyte. In addition, the electrode active material layer may further include at least one of a conductive material and a binder resin, if necessary. Additionally, the electrode active material layer may further include various additives in order to supplement or improve the physicochemical properties of the electrode.

According to the present disclosure, in the case of a negative electrode active material, lithium metal may be used as a negative electrode active material for a lithium ion secondary battery. In addition to lithium metal, any material used conventionally as a negative electrode active material may be used. For example, the negative electrode active material may include at least one selected from: carbon such as non-graphitizable carbon, graphitic carbon, or the like; metal composite oxides such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb or Ge; Me': Al, B, P, Si, an element of Group 1, Group 2 or Group 3 in the Periodic Table, or halogen; $0 < x \le 1$; $1 \le y \le 3$; $1 \le z \le 8$); lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, or the like; conductive polymers such as polyacetylene; Li—Co—Ni based materials; titanium oxide; and lithium titanium oxide, or the like.

In the case of a positive electrode, the electrode active material may be any material used conventionally as a positive electrode active material for a lithium ion secondary battery. For example, the positive electrode active material may include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1-x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_5$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MOs$ (wherein M=Fe, Co, Ni, Cu or Zn); lithium manganese composite oxides having a spinel structure and represented by the formula of $LiNi_xMn_{2-x}O_4$; $LiMn_2O_4$ in which Li is partially substituted with an alkaline earth metal ion; disulfide compounds; $Fe_2(MoO_4)_3$; or the like.

According to the present disclosure, the current collector includes a metal plate having electrical conductivity and may be one selected suitably depending on polarity of electrodes known in the field of secondary batteries.

According to the present disclosure, the conductive material is added generally in an amount of 1-30 wt % based on the total weight of the mixture including the electrode active material. The conductive material is not particularly limited, as long as it causes no chemical change in the corresponding battery and has conductivity. For example, the conductive material include any one selected from: graphite, such as natural graphite or artificial graphite; carbon black, such as carbon black, acetylene black, Ketjen black, channel black, furnace black, lamp black or thermal black; conductive fibers, such as carbon fibers or metallic fibers; carbon fluoride metal powder, such as aluminum or nickel powder; conductive whisker, such as zinc oxide or potassium titanate; conductive metal oxide, such as titanium oxide; and conductive materials, such as polyphenylene derivatives, or a mixture of two or more of them.

According to the present disclosure, the binder resin is not particularly limited, as long as it is an ingredient which assists binding of the electrode active material with the conductive material, and binding to the current collector. Particular examples of the binder resin include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubber, various copolymers, or the like. In general, the binder resin may be used in an amount of 1-30 wt %, or 1-10 wt %, based on 100 wt % of electrode active material layer.

Meanwhile, according to the present disclosure, the electrode active material layer may include at least one additive, such as an oxidation stabilizing additive, reduction stabilizing additive, flame retardant, heat stabilizer, anti-fogging agent, or the like, if necessary According to the present disclosure, the solid electrolyte material contained in the electrode may include at least one of a polymeric solid electrolyte, oxide-based solid electrolyte and a sulfide-based solid electrolyte. Reference will be made to the above description about each electrolyte material.

In the solid electrolyte material contained in the electrode, in the case of a positive electrode, an electrolyte material having excellent oxidation stability may be used as a solid electrolyte. In addition, in the case of a negative electrode, an electrolyte material having excellent reduction stability is used preferably as a solid electrolyte. However, the scope of the present disclosure is not limited thereto. Since the solid electrolyte mainly functions to transport lithium ions in the electrode, any material having a high ion conductivity, such as $10^{-7}$ s/cm or more, or $10^{-5}$ s/cm or more, may be used with no particular limitation.

In still another aspect of the present disclosure, there is provided a secondary battery having the above-described structure. There are also provided a battery module including the secondary battery as a unit cell, a battery pack including the battery module, and a device including the battery pack as a power source. Herein, particular examples of the device may include, but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Examples will be described more fully hereinafter so that the present disclosure can be understood with ease. However, the following examples are for illustrative purposes only and the scope of the present disclosure is not limited thereto.

Example 1

1. Manufacture of Solid Electrolyte Membrane (1) Manufacture of Electrolyte Film Two sheets of electrolyte films were obtained by the following method. Polyethylene oxide (PEO, $M_W$=4,000,000 g/mol) was dissolved in acetonitrile (AN) to prepare a 4 wt % polymer solution. Herein, LiTFSI as a lithium salt was also introduced thereto at a molar ratio of [EO]/[Li$^+$]=18/1. The resultant mixture was agitated overnight at 70° C. so that PEO and lithium salt might be dissolved sufficiently in the polymer solution. Next, an additive solution containing an initiator and a curing agent was prepared. The curing agent was polyethylene glycol diacrylate (PEGDA, $M_w$=575), the initiator was benzoyl peroxide (BPO), PEGDA was used in an amount of 20 wt % based on PEO, BPO was used in an amount of 1 wt % based on PEGDA, and acetonitrile was used as a solvent. The additive solution was agitated for about 1 hour so that the ingredients introduced thereto might be mixed thoroughly. Then, the additive solution was added to the polymer solution and the two solutions were mixed thoroughly. The mixed solution was applied to and coated on a release film by using a doctor blade. The coating gap was set to 800 μm and the coating rate was set to 20 mm/min. The release film coated with the coating solution was transferred to a glass plate, allowed to maintain level, dried overnight at room temperature, and vacuum dried at 100° C. for 12 hours. In this manner, an electrolyte film was obtained. The resultant electrolyte layer had a thickness of about 50 μm.

(2) Manufacture of Porous Sheet Coated with Inhibiting Material

HAuCl$_4$.3H$_2$O was dissolved in ethanol at a concentration of 2 wt % to prepare a metal salt (chloride of Au) solution. A nonwoven web made of porous polyethylene and having a thickness of 11 μm and a porosity of 47% was prepared, and 20 μL of the metal salt solution was applied to the top surface of the nonwoven web through spin coating at a rate of 2,000 rpm and dried to remove ethanol.

(3) Manufacture of Solid Electrolyte Membrane

The porous sheet prepared from (2) was stacked with the electrolyte film obtained from (1) so that the porous sheet might be disposed between the solid electrolyte films. The resultant structure was subjected to roll calendaring with a controlled gap between rolls of 100 μm at 60° C. so that the electrolyte films might be pressed into the porous sheet through both surfaces of the porous sheet. In this manner, a solid electrolyte membrane including the porous sheet embedded in the solid electrolyte membranes were obtained.

The resultant solid electrolyte membrane had a thickness of about 100 μm.

2. Manufacture of Positive Electrode

NCM811 (LiNi$_{0.8}$Co$_{0.1}$Mn$_{0.1}$O$_2$) as a positive electrode active material, vapor grown carbon fibers (VGCF) as a conductive material, and a polymeric solid electrolyte (PEO+LiTFSI, molar ratio 18:1) were mixed at a weight ratio of 80:3:17, and the resultant mixture was introduced to acetonitrile, followed by agitation, to provide electrode slurry. An aluminum current collector having a thickness of 20 μm was prepared. The slurry was applied to the current collector using a doctor blade and the resultant product was vacuum-dried at 120° C. for 4 hours. Then, pressing was carried out by using a roll press to obtain an electrode having an electrode loading amount 2 mAh/cm$^2$, an electrode layer thickness of 48 μm and a porosity of 22%.

3. Manufacture of Battery

The positive electrode was cut into a circular shape having an area of 1.4875 cm$^2$. In addition, lithium metal foil cut into a circular shape having an area of 1.7671 cm$^2$ was prepared as a counter electrode. The solid electrolyte membrane obtained from Example 1 was interposed between the two electrodes to obtain a coin-type half-cell.

Example 2

A solid electrolyte membrane was obtained in the same manner as Example 1, except that HAuCl$_4$.3H$_2$O was used at a concentration of 5 wt %, when manufacturing the porous sheet coated with an inhibiting material. In addition, the resultant solid electrolyte membrane was used to obtain a battery in the same manner as Example 1.

Example 3

Three sheets of electrolyte films were prepared in the same manner as Example 1. In addition, two sheets of porous sheets coated with an inhibiting material were prepared in the same manner as Example 1. The electrolyte films and porous sheets were stacked alternately in such a manner that one porous sheet might be disposed between two electrolyte films, thereby providing a laminate structure. The laminate structure was subjected to roll pressing by using a pressurization roll so that the electrolyte films might be pressed into the sheets. The pressurization roll was controlled with a gap of 100 μm and calendaring was carried out at 60° C. In this manner, a solid electrolyte membrane including a support layer between solid electrolyte layers was obtained. The resultant solid electrolyte membrane had a thickness of about 150 μm.

Example 4

A solid electrolyte membrane was obtained in the same manner as Example 1, except that the porous sheet had a porosity of 78%. In addition, the resultant solid electrolyte membrane was used to obtain a battery in the same manner as Example 1.

Example 5

A solid electrolyte membrane was obtained in the same manner as Example 4, except that HAuCl$_4$.3H$_2$O solution having a concentration of 2 wt % was coated not through spin coating but through dip coating (coating rate of 5 m/min). In addition, the resultant solid electrolyte membrane was used to obtain a battery in the same manner as Example 1.

Comparative Example 1

One sheet of electrolyte film was prepared in the same manner as Example 1. In addition, a battery was obtained in the same manner as Example 1, except that the electrolyte film was used as a solid electrolyte membrane. The electrolyte membrane had a thickness of 50 μm.

Comparative Example 2

Two sheets of electrolyte films were prepared in the same manner as Example 1. Two sheets of electrolyte films were stacked without using any porous sheet and laminated with each other through calendaring at 60° C. with a gap between rolls controlled to 100 μm, thereby providing an electrolyte membrane. In addition, the resultant solid electrolyte membrane was used to obtain a battery in the same manner as Example 1. The electrolyte membrane had a thickness of 100 μm.

Comparative Example 3

Three sheets of electrolyte films were prepared in the same manner as Example 1. Three sheets of electrolyte films were stacked without using any porous sheet and laminated with one another through calendaring at 60° C. by using a pressurization roll, thereby providing an electrolyte membrane. In addition, the resultant solid electrolyte membrane was used to obtain a battery in the same manner as Example 1. The electrolyte membrane had a thickness of 150 μm.

Comparative Example 4

A first electrolyte film and a second electrolyte film were prepared in the same manner as Example 1. HAuCl$_4$.3H$_2$O was dissolved in ethanol at a concentration of 2 wt % to prepare a metal salt (chloride of Au) solution. Then, 20 μL of the solution was applied to one surface of the first electrolyte film through spin coating at a rate of 2,000 rpm, followed by drying, to form an inhibiting material layer. After that, the first electrolyte film and the second electrolyte film were stacked in such a manner that the inhibiting material layer might be disposed between the electrolyte films and subjected to calendaring at 60° C. by using a pressurization roll to carry out lamination of two sheets of electrolyte films, thereby providing an electrolyte membrane. In addition, the resultant solid electrolyte membrane was used to obtain a battery in the same manner as Example 1. The electrolyte membrane had a thickness of 100 μm.

Test Example 1: Evaluation of Ion Conductivity of Solid Electrolyte Membrane Each of the solid electrolyte membranes according to Examples and Comparative Examples was cut into a circular shape of 1.1761 cm$^2$. Then, the solid electrolyte membrane was interposed between two sheets of stainless steel (SUS) to obtain a coin cell. The electrochemical impedance of the coin cell was determined by using an impedance analyzer (VMP3, Bio logic science instrument) at 60° C. under the conditions of an amplitude of 10 mV and a scan range from 500 KHz to 20 MHz. The ion conductivity is calculated based on the result.

Test Example 2: Evaluation of Initial Discharge Capacity and Life Characteristics Each of the batteries according to Examples 1-5 and Comparative Examples 1-4 was charged/discharged at 60° C. and 0.05 C to evaluate initial discharge capacity.

Charge condition: constant current (CC)/constant voltage (CV), (4.15V, 0.005 C current cut-off)

Discharge condition: constant current (CC) 3V, (0.05 C)

Meanwhile, a short-circuit generation point was judged as a point of abnormal voltage behavior (unstable voltage variation) during charge, when evaluating life characteristics by carrying out charge/discharge at 0.1 C.

TABLE 1

|  | Ion conductivity (S/cm, 60° C.) | Discharge capacity (mAh/g, 4.15 V) | Short-circuit generation point (cycle No.) |
| --- | --- | --- | --- |
| Example 1 | $6 \times 10^{-5}$ | 145 | 22 |
| Example 2 | $5 \times 10^{-5}$ | 142 | 26 |
| Example 3 | $6 \times 10^{-5}$ | 138 | 32 |
| Example 4 | $8 \times 10^{-5}$ | 151 | 18 |
| Example 5 | $8 \times 10^{-5}$ | 152 | 20 |
| Comparative Example 1 | $1 \times 10^{-4}$ | 156 | 5 |
| Comparative Example 2 | $1 \times 10^{-4}$ | 154 | 7 |
| Comparative Example 3 | $9 \times 10^{-5}$ | 145 | 8 |
| Comparative Example 4 | $1 \times 10^{-4}$ | 159 | 18 |

As can be seen from Table 1, each of the batteries including the solid electrolyte membranes according to Examples 1-5 disclosed herein shows higher ion conductivity and discharge capacity, as compared to the batteries according to Comparative Examples, and also shows a delay in short-circuit generation point. Particularly, when comparing Example 1 with Comparative Example 4, it can be seen that the inhibiting material causes reaction effectively at a site where lithium dendrite grows by the support member, even when the content of inhibiting layer is small, and thus the short-circuit generation point is delayed.

DESCRIPTION OF DRAWING NUMERALS 11, 110: Positive electrode current collector
12, 120: Positive electrode
14, 140: Negative electrode
14a, 140a: Lithium dendrite
13, 130: Solid electrolyte membrane
130a: Support layer
131: Support member, porous sheet
132: Inhibiting material
133: Solid electrolyte material

What is claimed is:

1. A solid electrolyte membrane comprising:
a support member, a lithium dendrite growth-inhibiting material and a first solid electrolyte material,
wherein the support member is a porous sheet including a plurality of pores that may be penetrated through by flowable materials, which is embedded in the solid electrolyte membrane, and is at least partially surface-coated with the lithium dendrite growth-inhibiting material;
the lithium dendrite growth-inhibiting material is provided in the form of (a1) a metal salt derived from a metal having lower ionization tendency as compared to lithium, (a2) a metal ion thereof, or both (a1) and (a2); wherein the metal is Au, Pt, or both Au and Pt; and
the solid electrolyte membrane has an ion conductivity of $1.0 \times 10^{-7}$ S/cm or more.

2. The solid electrolyte membrane according to claim 1, wherein the metal salt comprises at least one selected from the group consisting of chloride, iodide, cyanide, bromide, sulfide, hydroxide, phosphite, and chloride hydrate.

3. The solid electrolyte membrane according to claim 1, wherein the first solid electrolyte material comprises an ion conductive polymeric solid electrolyte material.

4. The solid electrolyte membrane according to claim 3, wherein the ion conductive polymeric solid electrolyte material is prepared by adding a polymer resin to a solvated lithium salt, and shows an ion conductivity.

5. The solid electrolyte membrane according to claim 1, wherein the porous sheet is at least one of a polymer film, a woven web including a polymeric material, and a non-woven web including a polymeric material.

6. The solid electrolyte membrane according to claim 1, wherein the support member is disposed in such a manner that the support member may not be exposed to a top surface, bottom surface or both top and bottom surfaces of the solid electrolyte membrane.

7. The solid electrolyte membrane according to claim 1, which further comprises a second solid electrolyte material selected from the group consisting of a polymeric solid electrolyte material, an oxide-based solid electrolyte material, a sulfide-based solid electrolyte material and mixtures thereof.

8. A method for manufacturing the solid electrolyte membrane as defined in claim 1, comprising:
(S1) preparing at least one first solid electrolyte film and at least one support member, wherein the at least one support member is coated with the lithium dendrite growth-inhibiting material;
(S2) stacking the support member with the at least one first solid electrolyte film to prepare a laminate structure; and
(S3) pressing the laminate structure so that the support member is embedded in the at least one first solid electrolyte film.

9. The method according to claim 8, wherein the laminate structure in (S2) comprises the support member interposed between two sheets of the at least one first solid electrolyte films.

10. A method for manufacturing the solid electrolyte membrane as defined in claim 1, which comprises impregnating a support member coated with the lithium dendrite growth-inhibiting material with an impregnating composition comprising a first solid electrolyte material, wherein the pores of the support member are filled with the impregnating composition.

11. An all-solid-state battery comprising a negative electrode, a positive electrode and a solid electrolyte membrane interposed between the negative electrode and the positive electrode, wherein the negative electrode comprises lithium metal as an electrode active material, and the solid electrolyte membrane is as defined in claim 1.

* * * * *